March 26, 1929. A. ZILBERSHER 1,707,154
COMBINATION SCRAPER, BLADE SHARPENER AND CORN CUTTER
Filed March 23, 1927
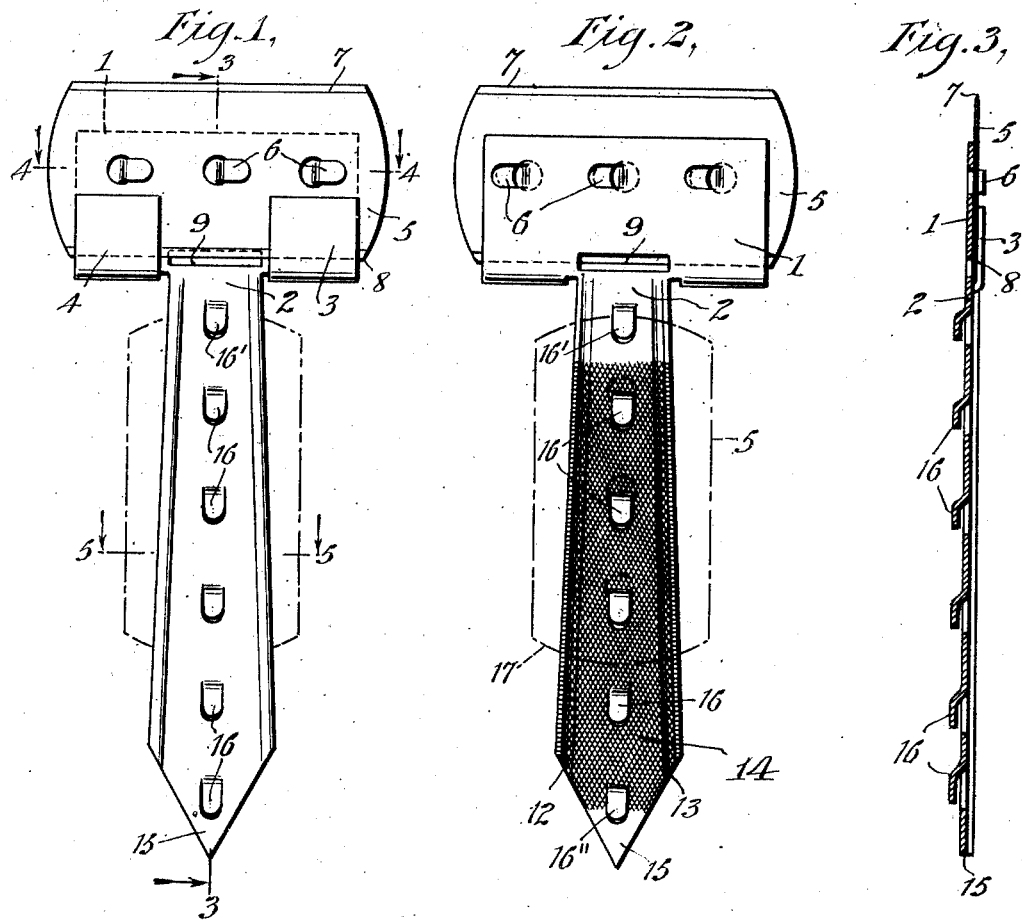
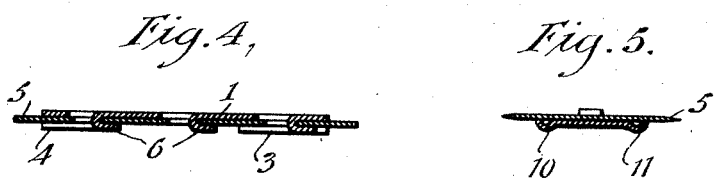
WITNESSES
Edw. Thorpe
A. L. Kitchin
INVENTOR
Abraham Zilbersher
BY Munn & Co.
ATTORNEY Patented Mar. 26, 1929.

1,707,154

UNITED STATES PATENT OFFICE.

ABRAHAM ZILBERSHER, OF NEW YORK, N. Y.

COMBINATION SCRAPER, BLADE SHARPENER AND CORN CUTTER.

Application filed March 23, 1927. Serial No. 177,782.

This invention relates to a combined tool, and has for an object to provide an improved tool which presents a combination scraper, blade sharpener and corn cutter.

Another object is to provide an improved combination tool wherein a single cutting blade may be differently adjusted so as to act in different ways for cutting different objects or adjusted to be in position for sharpening.

A further object of the invention is to provide a combination tool having a substantially T-shaped framework with means for receiving a double edge blade in a plurality of positions so that both edges may be utilized or only one edge as preferred.

A still further object of the invention is to provide an improved device, wherein a removable cutter is provided and on the handle a nail file and cleaner is presented.

In the accompanying drawing—

Figure 1 is a plan view of a combination tool disclosing an embodiment of the invention.

Figure 2 is a view of the tool shown in Figure 1, looking at the same from the opposite edge.

Figure 3 is a sectional view through Figure 1, approximately on line 3—3.

Figure 4 is a transverse sectional view through Figure 1 on line 4—4.

Figure 5 is a sectional view through Figure 1 on line 5—5.

Referring to the accompanying drawing by numerals, 1 indicates a flat body provided with a handle 2 and with a pair of turned over protecting plates 3 and 4 for protecting one of the edges of the cutter 5 when the device is in the position shown in Figures 1 and 2. The body 1 is provided with a number of pressed out resilient tongues 6, there being three shown, though a greater or less number could be used. Three tongues 6 are preferably provided as they will accommodate the three holes in a Gillette blade, whereby the edge 7 of the blade will be exposed while the edge 8 will be protected by plates 3 and 4, except opposite the opening 9 formed in body 1. This opening is provided in order that the device at this point may act as a wart or corn cutter. By moving the device over a corn and pressing the corn, small parts will be shaved or cut from the corn without danger of injuring the person adjacent the corn. In addition to acting as a corn cutter when positioned as shown in Figures 1 and 2, the blade 5 is held so that the edge 7 may be sharpened on a hone, strop or other sharpening implement. Also the blade 5 when held in this position, might act to cut certain objects, as for instance, scrape objectionable matter off of glass panes or other surfaces. The handle 2 is made of a convenient length and is provided with stiffening beads 10 and 11 at each edge, said beads being formed by pressing the material whereby grooves 12 and 13 are presented. A nail file structure 14 is also formed on the handle 2, said file structure being formed in the grooves 12 and 13 and on the edges of the beads 10 and 11. A pointed end 15 is formed on the handle 2 so as to assist in cleaning and manicuring the nails of fingers whenever desired.

The handle 2 is also provided with a number of resilient pressed out tongues 16. These tongues are adapted to hold the blade 5 in the dotted position shown in Figures 1 and 2. When in this position, one end of blade 5 is projecting beneath the end tongue 16', three of the other tongues are extending through the apertures in the blade while the end 17 is preferably held in place by the thumb. This will permit the blade to be used to sharpen pencils or for cutting any desired object. Sometimes it is desired to have the blade 5 near point 15 and when this is the case, it is moved outwardly until the last tongue 16" is in the outermost hole of the blade 5. By re-arranging the blade 5 as described, the device may be used for many purposes and the blade held firmly in the desired position at all times, whether used for cutting purposes, scraping purposes or subjecting the blade to a sharpening member.

What I claim is:

A combination tool, comprising a substantially rectangular body provided with a pair of extensions on one side and an integral handle extending from the side having the extensions, said extensions being bent over said body to a position substantially parallel with the body, said body being formed with a row of tongues pressed therefrom and arranged on a central longitudinal line with the tongues facing in the same direction, said body near the juncture of the handle therewith being provided with a slot, a two edge blade carried by said tongues and extending beneath said turned over extensions and partly over said slot whereby one edge of the blade may act as a cutting blade and part of the other edge act as a scraper in connection with that part of the body forming said slot, and said handle being formed with a row of tongues pressed therefrom and facing in the same direction for receiving said blade.

ABRAHAM ZILBERSHER.